(12) United States Patent
Berenbaum et al.

(10) Patent No.: US 7,890,684 B2
(45) Date of Patent: Feb. 15, 2011

(54) TWO-CYCLE RETURN PATH CLOCKING

(75) Inventors: Alan D. Berenbaum, New York, NY (US); Jury Muchin, Clearwater Beach, FL (US)

(73) Assignee: Standard Microsystems Corporation, Hauppauge, NY (US)

( * ) Notice: Subject to any disclaimer, the term of this patent is extended or adjusted under 35 U.S.C. 154(b) by 175 days.

(21) Appl. No.: 11/469,287

(22) Filed: Aug. 31, 2006

(65) Prior Publication Data
US 2008/0059667 A1      Mar. 6, 2008

(51) Int. Cl.
G06F 13/36    (2006.01)
G06F 13/362   (2006.01)
G06F 3/00     (2006.01)
G06F 5/00     (2006.01)
G06F 1/00     (2006.01)
G06F 1/04     (2006.01)
G06F 1/24     (2006.01)
G06F 11/00    (2006.01)

(52) U.S. Cl. .................. 710/110; 710/60; 713/501; 713/503

(58) Field of Classification Search ............... 710/110, 710/60; 713/500–503
See application file for complete search history.

(56) References Cited

U.S. PATENT DOCUMENTS 5,006,982 A * 4/1991 Ebersole et al. ............ 710/263
5,272,729 A  12/1993 Bechade et al.
5,327,121 A *  7/1994 Antles, II ................... 710/110
5,349,683 A *  9/1994 Wu et al. .................... 714/801

(Continued)

FOREIGN PATENT DOCUMENTS

EP      1139242 A2 * 10/2001

(Continued)

OTHER PUBLICATIONS

Hwang et al., "An implementation and performance analysis of slave-side arbitration schemes for the ML-AHB BusMatrix", Proceedings of the 2007 ACM Symposium on Applied Computing (Seoul, Korea, Mar. 11-15, 2007), ACM, New York, NY, pp. 1545-1551.*

(Continued)

*Primary Examiner*—Faisal M Zaman
(74) *Attorney, Agent, or Firm*—Meyertons Hood Kivlin Kowert & Goetzel, P.C.; Jeffrey C. Hood (57) ABSTRACT

Return path clocking mechanism for a system including a master device connected to a plurality of slave devices via a bus. The master device may first generate a global clock. The master device may transmit data to one or more of the slave devices at a rate of one bit per clock cycle. One or more of the slave devices may transmit data to the master device at a rate of one bit per two consecutive clock cycles. The master device may sample the transmitted data on the second cycle of each two consecutive clock cycle period. Alternatively, the slave devices may transmit data to the master device at a rate of one bit per N consecutive clock cycles, where $N \geq 2$, and the master device may sample the transmitted data on the $N^{th}$ cycle of each N consecutive clock cycle period.

21 Claims, 7 Drawing Sheets

U.S. PATENT DOCUMENTS

| | | | | |
|---|---|---|---|---|
| 5,359,627 | A | * | 10/1994 | Resnikoff .................. 375/254 |
| 5,535,377 | A | | 7/1996 | Parks |
| 5,548,620 | A | | 8/1996 | Rogers |
| 5,867,543 | A | * | 2/1999 | Roberts et al. ............... 375/365 |
| 6,137,429 | A | * | 10/2000 | Chan et al. .................. 341/143 |
| 6,279,119 | B1 | * | 8/2001 | Bissett et al. ................. 714/12 |
| 6,535,946 | B1 | | 3/2003 | Bryant et al. |
| 6,622,218 | B2 | * | 9/2003 | Gharachorloo et al. ...... 711/141 |
| 6,630,851 | B2 | | 10/2003 | Masleid |
| 6,851,032 | B2 | | 2/2005 | LaBerge et al. |
| 6,874,047 | B1 | * | 3/2005 | Duguay et al. ............... 710/100 |
| 6,901,528 | B2 | | 5/2005 | Rangam |
| 6,920,540 | B2 | * | 7/2005 | Hampel et al. ............... 711/167 |
| 6,937,081 | B2 | * | 8/2005 | Ishikawa .................... 327/276 |
| 6,961,691 | B1 | * | 11/2005 | Selvidge et al. ............... 703/28 |
| 6,990,599 | B2 | | 1/2006 | Takamiya et al. |
| 7,009,969 | B1 | * | 3/2006 | Parrish et al. ................. 370/390 |
| 7,027,447 | B2 | | 4/2006 | Robertson et al. |
| 7,043,656 | B2 | * | 5/2006 | Riley .......................... 713/503 |
| 7,055,012 | B2 | | 5/2006 | LaBerge et al. |
| 7,069,371 | B2 | * | 6/2006 | Feng et al. .................. 710/305 |
| 7,139,937 | B1 | * | 11/2006 | Kilbourne et al. ............. 714/47 |
| 7,191,377 | B2 | * | 3/2007 | Berens et al. ............... 714/755 |
| 7,219,177 | B2 | * | 5/2007 | Chang et al. ................ 710/110 |
| 7,353,419 | B1 | * | 4/2008 | Liu ............................. 713/503 |
| 7,376,021 | B2 | * | 5/2008 | Heo et al. ............... 365/189.05 |
| 7,539,806 | B2 | * | 5/2009 | Chou et al. .................. 710/243 |
| 7,546,504 | B2 | * | 6/2009 | Riley et al. ................. 714/729 |
| 7,590,146 | B2 | * | 9/2009 | Murata ....................... 370/466 |
| 7,787,316 | B2 | * | 8/2010 | Katagiri ................ 365/189.16 |
| 2002/0046327 | A1 | * | 4/2002 | Gharachorloo et al. ...... 711/141 |
| 2004/0116151 | A1 | * | 6/2004 | Bosch et al. ............. 455/550.1 |
| 2004/0125665 | A1 | | 7/2004 | Chelcea |
| 2005/0270890 | A1 | | 12/2005 | Kim |
| 2006/0017519 | A1 | | 1/2006 | Pernia et al. |
| 2006/0031618 | A1 | * | 2/2006 | Hansquine et al. .......... 710/305 |
| 2006/0156049 | A1 | * | 7/2006 | Helio ......................... 713/500 |
| 2007/0016699 | A1 | * | 1/2007 | Minami ....................... 710/20 |
| 2007/0180201 | A1 | * | 8/2007 | Jain et al. ................... 711/154 |
| 2008/0123790 | A1 | * | 5/2008 | Coln et al. .................. 375/355 |

FOREIGN PATENT DOCUMENTS

| | | | |
|---|---|---|---|
| JP | 02057036 | A * | 2/1990 |
| JP | 07162675 | A * | 6/1995 |
| WO | WO 9855936 | A1 * | 12/1998 |

OTHER PUBLICATIONS

Bowman et al., "Time-borrowing multi-cycle on-chip interconnects for delay variation tolerance", Proceedings of the 2006 international Symposium on Low Power Electronics and Design (Tegernsee, Bavaria, Germany, Oct. 4-6, 2006), ACM, New York, NY, pp. 79-84.*

Chang, et al., "An optimal clock period selection method based on slack minimization criteria", ACM Trans. Des. Autom. Electron. Syst., vol. 1, Issue 3, Jul. 1996, ACM, pp. 352-370.*

Lee et al., "Cycle error correction in asynchronous clock modeling for cycle-based simulation", Proceedings of the 2006 Asia and South Pacific Design Automation Conference (Yokohama, Japan, Jan. 24-27, 2006), Asia and South Pacific Design Automation Conference, IEEE Press, Piscataway, NJ, pp. 460-465.*

\* cited by examiner

TWO-CYCLE RETURN PATH CLOCKING

BACKGROUND OF THE INVENTION

1. Field of the Invention

The present invention relates generally to data transfer methodologies, more particularly, to a return path clocking technique.

2. Description of the Related Art

One of the difficulties with conventional bus architectures running at high speed is that as the bus gets longer, propagation time causes an increasing delay for signals transmitted between widely separated devices. For instance, in systems that include a master device and a plurality of slave devices, it is often difficult to get signals from a near slave device and a distant slave device back to a receiving latch in the master device such that signals from both near and far devices meet setup and hold times within one clock cycle at the master latch.

Various techniques have been implemented to match the physical latency requirements to the speed of a bus. Typically, bus specifications define upper bounds on the spacing for components on the bus and the number of loads on the bus, with shorter distances and a reduced number of loads mandated for higher speed buses. PCI-66, at 66 MHz, for example, permits shorter overall trace length and fewer connected components than PCI-33, at 33 MHz. Some mechanism may use a central clock generator that carefully skews clocks for each connected component, so that the clocks compensate for the distance variations. Other mechanisms may use a source-synchronous clock, so that every transmitting device generates its own clock. Most bus architectures usually provide separate signal paths for outbound and return signals.

Using a central clock generator that skews clocks for each connected component typically increases the complexity and cost of the design, either in a custom chip or in a PLL-based addition to a master device. Reducing the overall bus length may be unacceptable if the goal of the bus is to interconnect devices that are widely separated. Similarly, if the design goals of the bus include interconnecting a significant number of devices, reducing the number of loads may not be a viable option. Some systems use point-to-point interconnection, in a ring or star configuration. However, this usually requires an increase in the number of pins required per device. Source-synchronous clocking may reduce potential bus bandwidth (by using a signal for the source clock) and may complicate termination of bus lines. Using separate signal paths for outbound and return signals may require an unacceptable increase in the number of traces as well as pins on the master and slave devices.

Many other problems and disadvantages of the prior art will become apparent to one skilled in the art after comparing such prior art with the present invention as described herein.

SUMMARY OF THE INVENTION

Various embodiments are disclosed of a method and apparatus for implementing a two-cycle return path clocking mechanism in a system. The system may include a master device connected to a plurality of slave devices via a bus. The master device may first generate a global clock. The master device may transmit data to one or more of the slave devices at a rate of one bit per clock cycle. One or more of the slave devices may subsequently transmit data to the master device at a rate of one bit per two consecutive clock cycles. The master device may sample the transmitted data on the second cycle of each two consecutive clock cycle period. In various embodiments, the master device and the slave devices may transmit and receive data via a shared signal line of the bus.

In some embodiments, after the master device transmits data to the one or more slave devices at a rate of one bit per clock cycle, the slave devices may transmit data to the master device at a rate of one bit per two or more consecutive clock cycles. In other words, the slave devices may transmit data to the master device at a rate of one bit per N consecutive clock cycles, where N≧2. In these embodiments, the master device may sample the transmitted data on the $N^{th}$ clock cycle of each N consecutive clock cycle period. For instance, in one embodiment, the slave devices may transmit data to the master device at a rate of one bit per three consecutive clock cycles. In this embodiment, the master device may sample the transmitted data on the third clock cycle of each three consecutive clock cycle period.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Figure 1:
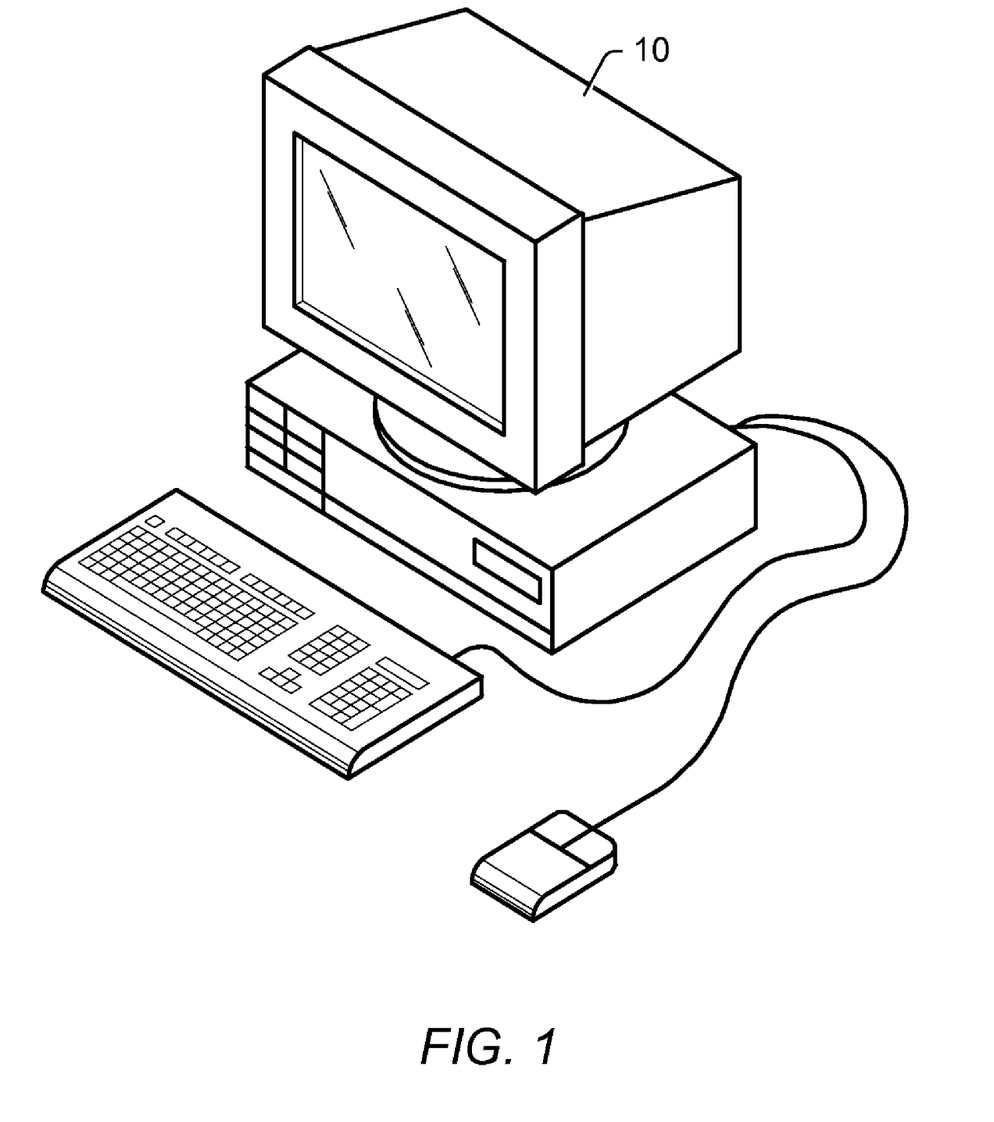
FIG. 1 is a drawing of one embodiment of a computer system.

FIG. 1 is a drawing of one embodiment of a computer system 10. Computer system 10 may be any of various types of computing or processing systems, including a personal computer system (PC), mainframe computer system, server system including a plurality of server blades, workstation, network appliance, Internet appliance, personal digital assistant (PDA), or other device or combinations of devices. In general, the term "computer system" can be broadly defined to encompass any device (or combination of devices) having at least one processor that executes instructions from a memory medium.

Computer system 10 may include at least one processor, which may be any of various types, including an x86 processor, e.g., a Pentium™ class, a PowerPC™ processor, a CPU from the SPARC™ family of RISC processors, as well as others. Also, computer system 10 may include one or more memory subsystems (e.g., Dynamic Random Access Memory (DRAM) devices). The memory subsystems may collectively form the main memory of computer system 10 from which programs primarily execute. The main memory may further store user applications and driver software programs. Computer system 10 may include a motherboard as well as various other components.

Serialized Secondary Bus

Figure 2:
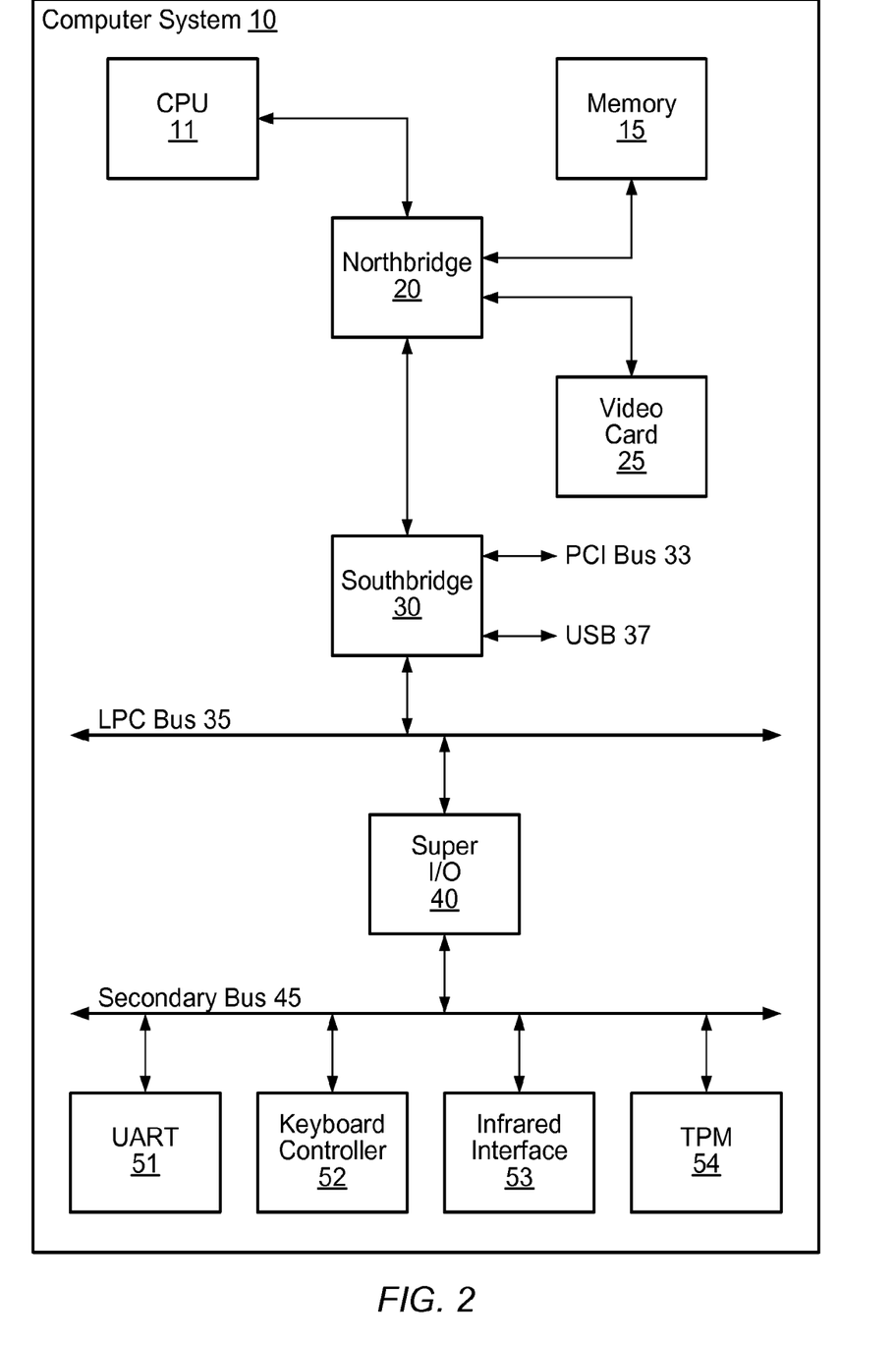
FIG. 2 is a block diagram of one embodiment of the computer system of FIG. 1.

FIG. 2 is a block diagram of one embodiment of computer system 10. As one example, FIG. 2 illustrates the components present on a motherboard of computer system 10. Computer system 10 may include a CPU 11, a northbridge 20, a main memory 15, a video card 25, and a southbridge 30. The northbridge 20 and the southbridge 30 may form the core logic chipset on the motherboard of computer system 10. It is noted that computer system 10 may include other types of logic chipsets. Logic chipsets may be defined as specialized motherboard chips on computers or expansion cards that have various characteristics and perform a variety of functions, e.g., bus bridge functions. The northbridge 20 may handle communications between at least the CPU 11, the main memory 15, and the southbridge 30. The southbridge 30 is connected to the northbridge 20 and may handle communications to and from a variety of peripheral or slave devices connected to several buses. As illustrated in the embodiment of FIG. 2, the southbridge 30 may include interfaces to at least one of the following buses: PCI bus 33, low pin count (LPC) bus 35, and USB 37. It is noted that each bus may connect to one or more devices. It is further noted that in other embodiments the southbridge 30 may interface with additional buses.

LPC bus 35 is a serial bus used to connect one or more slave devices in a computer system, as defined in the LPC interface specification version 1.1 and other versions thereof. LPC bus 35 typically includes up to thirteen signal lines; seven of the signals are required and 6 are optional. LPC bus 35 is often used in place of an industry standard architecture (ISA) bus, because it requires less signal lines.

In some implementations, a super I/O chip 40 may interface with LPC bus 35. Super I/O chips may be part of a class of I/O controller integrated circuits that combine interfaces to a variety of devices, typically low bandwidth devices, and other bus management functions in a single chip. As shown in FIG. 2, in one specific implementation, super I/O chip 40 may support several slave devices, such as a universal asynchronous receiver-transmitter (UART) 51, a keyboard controller 52, an infrared device 53, and a trusted platform module (TPM) 54. It is noted, however, that in other implementations, super I/O chip 40 may support other low bandwidth devices, e.g., a thermal sensor and a floppy drive controller. It is further noted that in some embodiments computer system 10 may include other types of bus controllers having similar functionality as super I/O chip 40.

In various embodiments, the super I/O chip 40 may include an interface for a serialized secondary bus 45. The secondary bus 45 may support all communications, including data transfer, clocking, interrupt, specialized broadcasts, and DMA requests, between super I/O chip 40 and slave devices 51-54 on three wires. Bus 45 may also support forwarding of LPC bus transfers from super I/O chip 40 to one or more of the slave devices 51-54, e.g., DMA cycles and TPM cycles on the LPC bus 35. It is noted, however, that in other embodiments bus 45 may include one or two signal lines, or at least may use less signal lines compared to LPC bus 35.

Prior art computer systems use other buses, e.g., LPC bus 35, to connect the southbridge 30 to certain slave devices, such as low bandwidth devices 51-54. However, using an LPC bus introduces some routing constraints, because space on motherboards is usually very limited and the LPC bus typically requires seven to thirteen signal lines.

In one embodiment, bus 45 is used in place of at least a portion of the LPC bus 35, as shown. Bus 45 may be a "reduced pin count" bus relative to LPC bus 35. Connecting devices 51-54 via bus 45 eliminates some of the routing constraints and congestion associated with using buses such as the LPC bus 35, because bus 45 requires less signal lines than the LPC bus 35, e.g., in some implementations bus 45 only requires three signal lines. The reduced pin count may reduce package costs and may result in lower power due to fewer switching signals. Also, moving some devices to bus 45 may reduce the loading on the LPC bus 35, which may improve the reliability of the LPC bus 35. Furthermore, as shown in the embodiment of FIG. 2, by bridging the LPC bus 35, bus 45 may extend the reach of the LPC bus 35 so that peripherals may be placed further from the southbridge 30.

Figure 3:
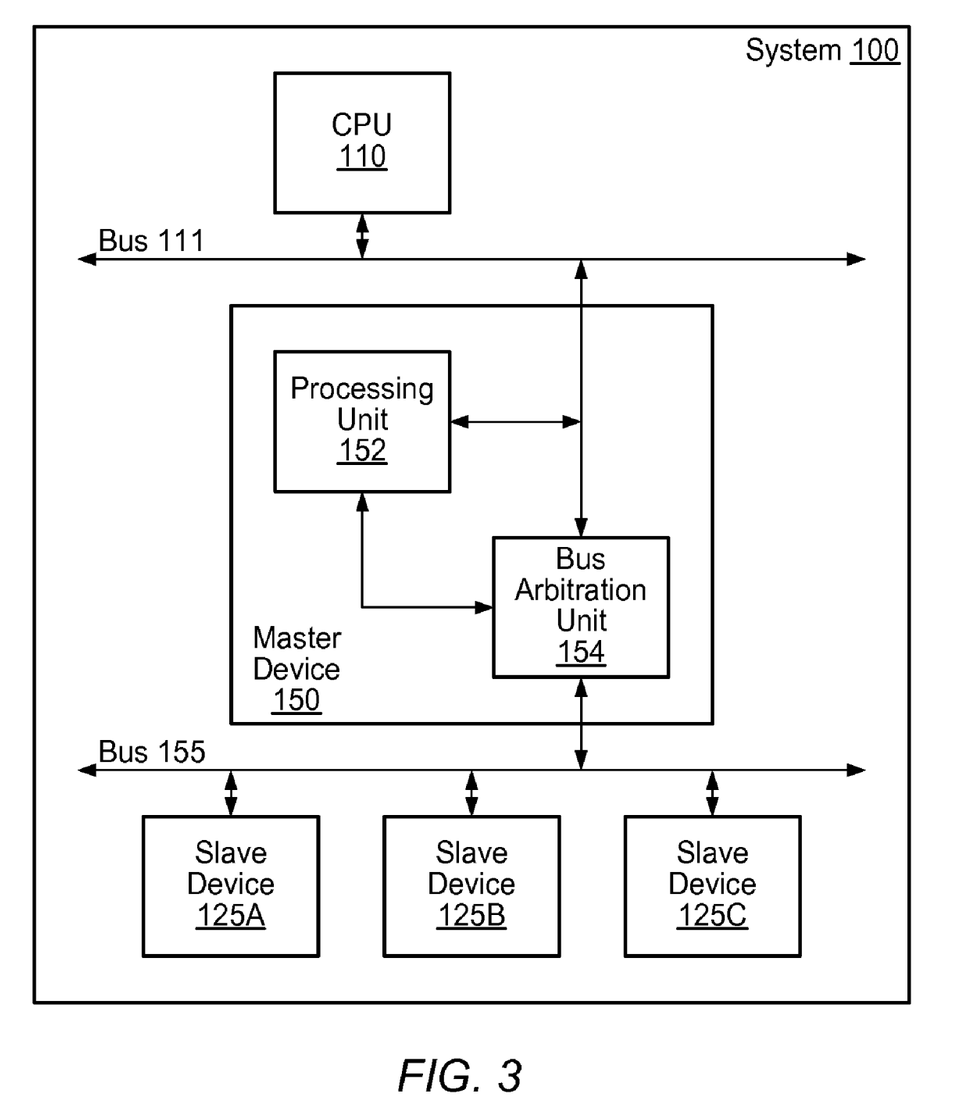
FIG. 3 is a block diagram of one embodiment of a system including a master device and a plurality of slave devices.

FIG. 3 is a block diagram of one embodiment of a system 100. It is noted that in one embodiment, system 100 may be illustrative of computer system 10 of FIG. 1 and FIG. 2. However, it is noted that system 100 may be any of various types of computing or processing systems, including a personal computer system (PC), mainframe computer system, workstation, server blade, network appliance, system-on-a-chip (SoC), Internet appliance, personal digital assistant (PDA), television system, audio systems, grid computing system, or other device or combinations of devices, which in some instances form a network. For instance, in some embodiments, master device 150 and slave devices 125 may collectively form a network, e.g., a local area network (LAN) or a wireless network. In other embodiments, system 100 may be a circuit board or motherboard of a computer system, e.g., a laptop computer.

In one specific implementation, system 100 is formed as illustrated in the embodiment of FIG. 3. System 100 may include a CPU 110, a bus 111, a master device 150, slave devices 125A-C, and a bus 155. CPU 110 may be connected to master device 150 through bus 111, and master device 150 may be connected to the slave devices 125 via bus 155. In some embodiments, system 100 may implement a two-cycle return path clocking mechanism for bus transactions between master device 150 and slave devices 125, as will be described further below with reference to FIGS. 4-7.

System 100 may include a variety of slave devices, usually low bandwidth devices, such as an infrared interface, a universal asynchronous receiver-transmitter (UART), a keyboard controller, a parallel port, a serial port, a mouse interface, a thermal sensor, and floppy disk controller, among others. In one specific implementation, one of the slave devices 125 of system 100 may be a TPM, e.g., TPM 54 of FIG. 2. It is noted, however, that in other implementations system 100 may include other kinds of slave devices with different functionality. Also, in some embodiments, at least a subset of the slave devices may represent nodes on a network. It is further noted that system 100 may include any number of slave devices 125.

In various embodiments, bus 111 may be LPC bus 35, and bus 155 may be serialized secondary bus 45 described above with reference to FIG. 2. In these embodiments, bus 155 may be a "reduced pin count" bus relative to the LPC bus, e.g., a three-wire bus. It is noted, however, that in other embodiments bus 111 may be another type of bus, for example, an ISA or EISA bus. It is further noted that bus 155 may be another type of bus besides a three-wire bus, e.g., a two-wire bus or a four-wire bus, and may have various characteristics. In some embodiments, master device 150 may be configured to operate as a bus controller or I/O controller. For instance, master device may be super I/O chip 40 described above with reference to FIG. 2.

As illustrated in the embodiment of FIG. 3, master device 150 may includes a processing unit 152 and a bus arbitration unit 154. Processing unit 152 may initiate bus transactions intended for the slave devices 125, and bus arbitration unit 154 may arbitrate ownership of bus 155 between processing unit 152 and bus 111, as will be described further below.

It should be noted that the components described with reference to FIGS. 2 and 3 are meant to be exemplary only, and are not intended to limit the invention to any specific set of components or configurations. For example, in various embodiments, one or more of the components described may be omitted, combined, modified, or additional components included, as desired. For instance, in some embodiments, master device 150 may not include an embedded processor, e.g., processing unit 152. Furthermore, it is noted that the components of computer system 10 or system 100 may be implemented in software and/or hardware.

During operation, CPU 110 may initiate one or more bus transactions intended for slave devices 125. CPU 110 may transmit the bus transactions to master device 150 (e.g., an I/O controller) over bus 111 (e.g., LPC bus 35). Master device 150 may translate and forward the bus transactions corresponding to bus 111 (e.g., LPC bus transactions) to one or more of the slave devices 125 over bus 155. For instance, if bus 111 is an LPC bus and bus 155 is a three-wire bus, master device 150 translates the LPC bus transactions into the protocol corresponding to the three-wire bus, and then forwards the bus transactions to one or more of the slave devices 125.

Processing unit 152 may also initiate bus transactions intended for slave devices 125. For example, in one specific implementation, processing unit 152 is an embedded microcontroller of master device 150, which manages bus transactions for slave devices 125 to off-load some tasks from CPU 110. In this manner, this architecture helps to distribute the processing needs within system 100 effectively, in addition to solving some routing challenges.

Since at any given time both processing unit 152 and bus 111 may attempt to transmit signals to one or more of the slave devices 125, bus arbitration unit 154 may arbitrate ownership of bus 155. In some embodiments, bus arbitration unit 154 may assign ownership of bus 155 based on the priority of the transaction. It is noted, however, that in other embodiments bus arbitration unit 154 may arbitrate ownership of bus 155 by other methods, e.g., LPC bus transactions may always have the highest priority, or bus ownership may alternate between bus 111 and processing unit 152. In response to receiving a bus transaction from either bus 111 or processing unit 152, one or more of the slave devices 125 performs an operation corresponding to the bus transaction, e.g., a temperature sensing function.

It is noted that some slave devices may communicate with master device 150 and CPU 110, for example, after performing a designated operation. Therefore, in various embodiments, master device 150 may also be configured to translate and forward bus transactions received from the slave devices 125 to bus 111.

Two-Cycle Return Path Clocking

Figure 4:
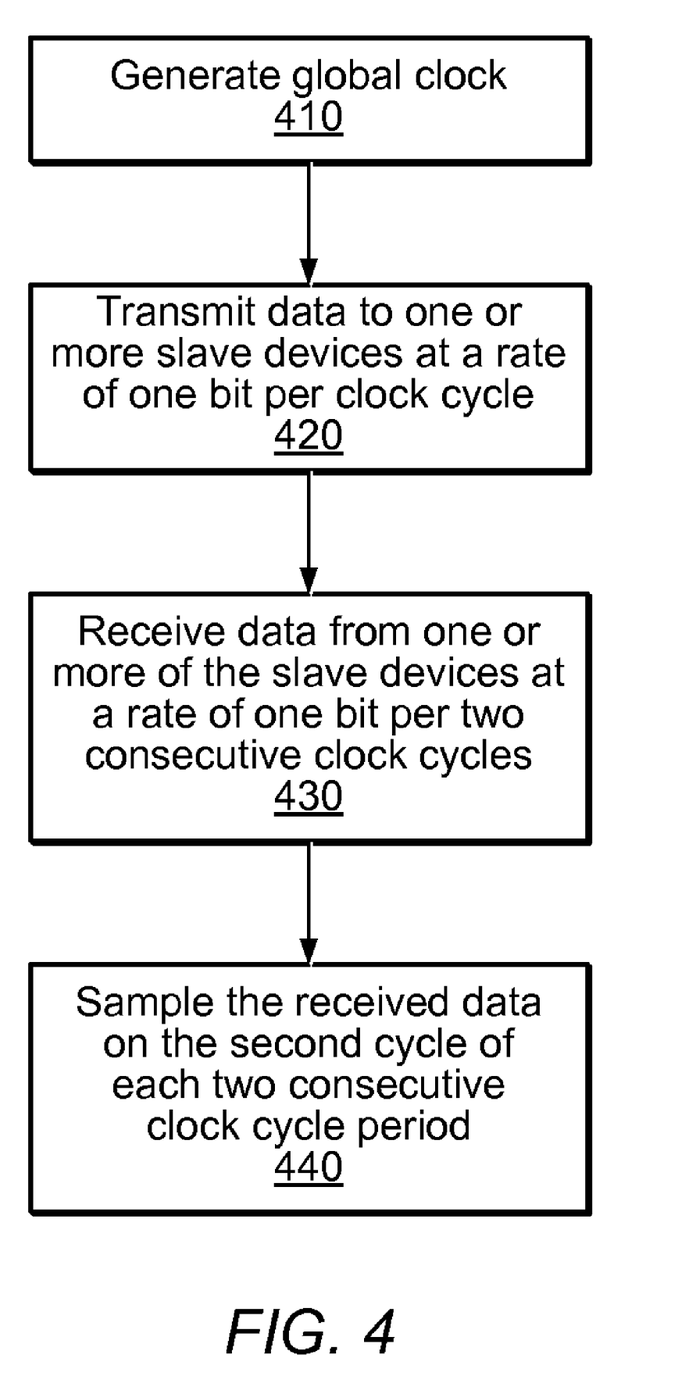
FIG. 4 is a flow diagram illustrating a method for implementing two-cycle return path clocking, according to one embodiment.

FIG. 4 is a flow diagram illustrating a method for implementing two-cycle return path clocking, according to one embodiment. Specifically, the flow diagram illustrates a method for implementing two-cycle return path clocking in a system including a master device and a plurality of slave devices, e.g., system 10 of FIG. 2 or system 100 of FIG. 3. It is noted, however, that the method may be implemented in numerous other systems having various characteristics and which include a master device and a plurality of slave devices. It is further noted that in various embodiments, some of the steps shown may be performed concurrently, in a different order than shown, or omitted. Additional steps may also be performed as desired.

Referring collectively to the embodiments illustrated in FIG. 4 and FIG. 3, during operation, master device 150 may generate a global clock used for synchronizing master device 150 and slave devices 125 (block 410). Master device 150 may then initiate bus transactions with one or more of the slave devices 125. In various embodiments, data transmission in the corresponding clock cycles may occur in phases. For instance, in the first phase, master device may drive bus 155, and in the second phase, a targeted slave chip may drive bus 155. The first phase may be referred to as the outbound phase, and the second phase may be referred to as the inbound phase. In some embodiments, a Start signal may precede the outbound phase. The Start signal may enable both master device 150 and slave devices 125 to synchronize their bus controllers so that during bus transactions each device knows exactly in which clock cycle the transaction is currently operating.

During the outbound phase, master device 150 may transmit data to one or more of the slave devices 125 at a rate of one bit per clock cycle (block 420). Specifically, since in some embodiments bus 155 may include more than one data line, master device 150 may transmit data to one or more of the slave devices 125 at a rate of one bit per clock cycle per data line of bus 155. In other words, data generated by master device 150 is clocked at the full rate of the global bus clock. In various embodiments, slave devices 125 may perform one or more operations corresponding to the bus transactions, e.g., a temperature sensing function, and then send reply data to the master device 150. During the corresponding inbound phase, one or more of the slave devices 125 may transmit data to master device 150 at a rate of one bit per two consecutive clock cycles. In other words, data generated by a slave device 125 is clocked at half the rate of the global bus clock.

Master device 150 may receive the data transmitted by one or more slave devices 125 at a rate of one bit per two consecutive clock cycles (block 430). Master device may then sample the received data on the second cycle of each two consecutive clock cycle period (block 440). Since master device 150 and all the slave devices 125 are synchronized to the clock and the phases generated by master device 150, slave devices 125 begin the two-cycle bit period on a clock determined by master device 150, so that master device 150 may determine which cycle is the second cycle of the two-cycle bit period. In this manner, the bit rate on the slave-to-master chip path (i.e., the return path) is one half the bit rate of the master chip-to-slave path. For example, if the master chip clock rate is 100 MHz and there is only one data line, the bit rate for master chip-to-slave transmissions is 100 Mb/S, while the rate for slave-to-master chip transmissions is 50 Mb/S.

In some embodiments, during the inbound phase, each of the slave devices 125 may transmit data to master device 150 and to one or more of the other slave devices 125 at a rate of one bit per two consecutive clock cycles. In these embodiments, as described above, each of master device 150 and the acquiring slave devices 125 may sample the transmitted data on the second cycle of each two consecutive clock cycle period.

As described above, bus 155 may be a "reduced pin count" bus relative to the LPC bus, for example, a three-wire bus. It is noted, however, that in other embodiments master device 150 may implement the two-cycle return path clocking technique via other types of buses, e.g., an LPC or ISA bus, or other bus architectures that include a plurality of data lines. In various embodiments, master device 150 and each of the plurality of slave devices 125 may transmit data via the same signal line, i.e., a shared signal line, as will be illustrated below with reference to FIGS. 5A and 6A. It is also noted that in some embodiments, slave devices 125 may initiate some bus transactions using the global clock generated by master device 150.

Figure 5A:
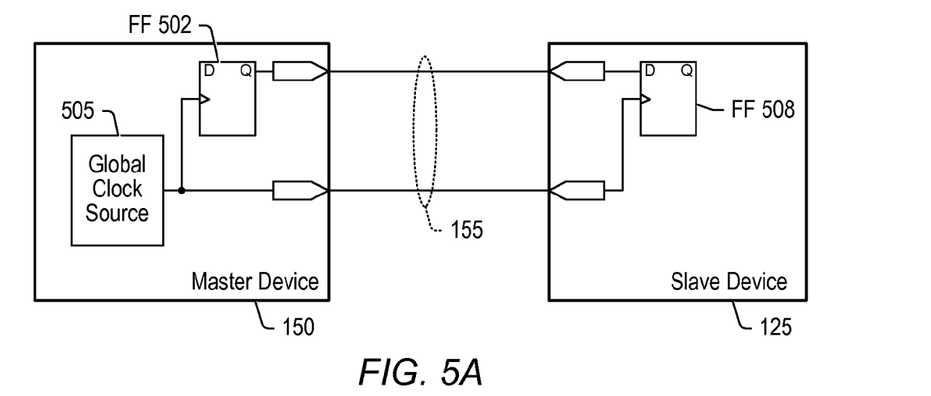
FIG. 5A is a block diagram of one embodiment of a mechanism for implementing the outbound phase in bus transactions between the master device and the slave devices.
Figure 5B:
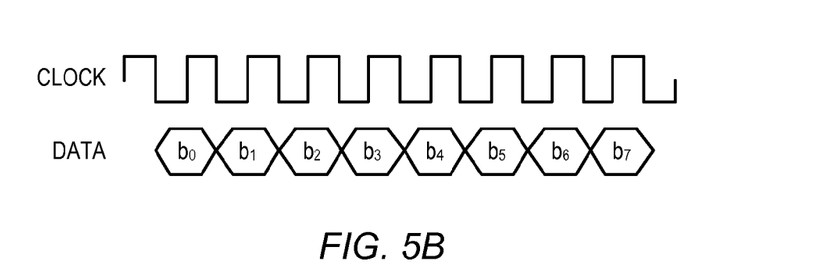
FIG. 5B is a timing diagram illustrating an example of the outbound phase of a bus transaction between the master device and the slave devices, according to one embodiment.

FIG. 5A is a block diagram of one embodiment of the mechanism for implementing the outbound phase in bus transactions between master device 150 and slave devices 125 via bus 155. As illustrated, the master device output and the slave device input are clocked on the same clock, which is generated by global clock source 505 and driven by master device 150. Data produced by the flip-flop (FF) 502 is produced at a rate of one bit per clock cycle, as illustrated in the timing diagram of FIG. 5B, and received by FF 508 at the slave device 125. As shown, in one embodiment, the data may be sampled on the rising edge of the clock. It is noted, however, that in other embodiments the data may be sampled on the falling edge of the clock.

Figure 6A:
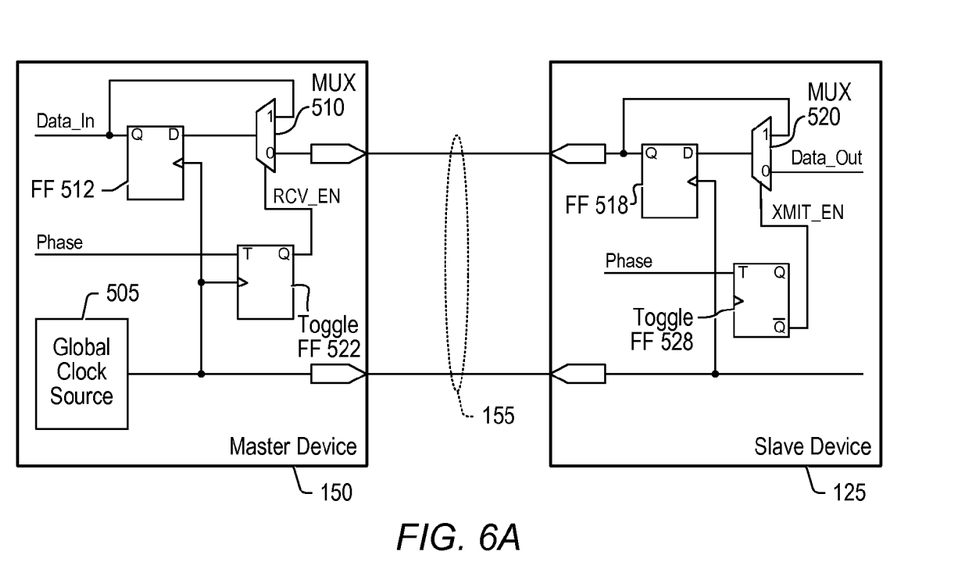
FIG. 6A is a block diagram of one embodiment of a mechanism for implementing the inbound phase in bus transactions between the master device and the slave devices.

FIG. 6A is a block diagram of one embodiment of the mechanism for implementing the inbound phase in bus transactions between master device 150 and slave devices 125 via bus 155. As illustrated, both FF 518 in slave device 125 and the acquiring FF 512 in master device 150 are clocked on the same global bus clock as the outbound circuit described above with reference to FIG. 5A. In the inbound direction, however, each of the flip-flops may be preceded by a multiplexer (MUX). For example, the D input of FF 518 may be connected to the output of MUX 520, and the D input of FF 512 may be connected to the output of MUX 510.

The input selection for each MUX is driven by a toggle flip-flop (FF). As illustrated, in one embodiment, toggle FF 528 may be connected to the input selection of MUX 520, and toggle FF 522 may be connected to the input selection of MUX 510. In this specific implementation, the Q output of a toggle FF is 0 while the T input is 0. When the T input is 1, the toggle FF complements its output on every transition of the global clock, in effect generating a clock that runs at half the rate of the global clock. The toggle FFs on both master device 150 and slave device 125 may be set to start toggling on exactly the same clock cycle by the phase input which may go high at the beginning of the inbound phase of a bus transaction. For example, if the inbound phase of a transaction begins on clock cycle 17 of the transaction, then both the master and slave devices will enable their respective toggle FFs on clock cycle 17.

Figure 6B:
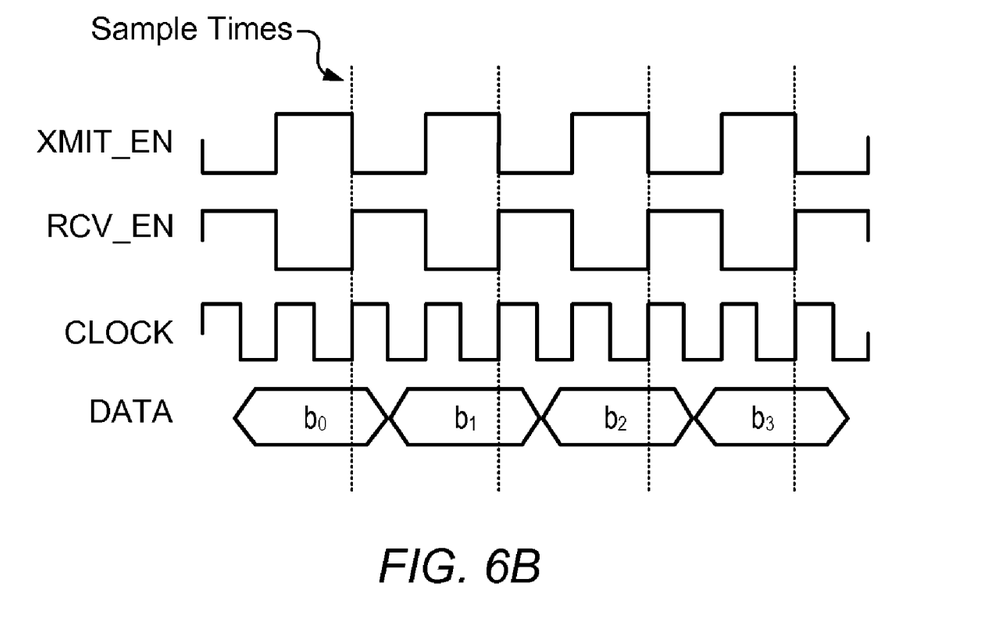
FIG. 6B is a timing diagram illustrating an example of the inbound phase of a bus transaction between the master device and the slave devices, according to one embodiment.
Figure 6C:
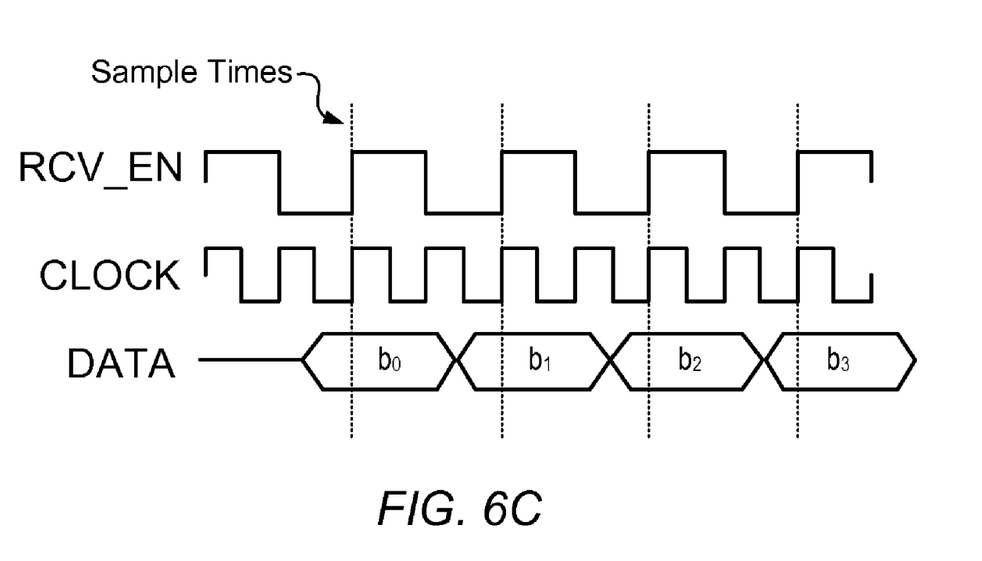
FIG. 6C is a timing diagram illustrating another example of the inbound phase of a bus transaction between the master device and the slave devices, according to one embodiment.

As illustrated in the timing diagram of FIG. 6B, in one embodiment, MUX 520 may be configured to select the Data_Out input when the $\overline{Q}$ output of toggle FF 528 (XMIT_EN signal) is low. In this embodiment, FF 518 may acquire data from its internal circuitry in the first half of the cycle generated by the Toggle FF (represented by the low portion of the cycle in the XMIT_EN signal). MUX 510 of master device 150 may be configured to acquire input data when the Q output of toggle FF 522 is low, which is the opposite of the toggle in slave device 125. Thus, master device 150 may acquire data in the second half of the toggle cycle, as shown in the RCV_EN signal in FIG. 6B, at a rate of two clock cycles per bit.

In various embodiments, slave device 125 may drive each bit of data for two clock cycles, first from the internal circuitry and then from a feedback path from FF 518. Master device 150 may begin sampling the transmitted data on the rising edge of the second base clock, e.g., as shown in FIG. 6B. As previously described, because both the master and slave devices have been synchronized by the Start signal prior to the outbound phase, the two components may agree on which cycle the two-cycle bit period begins. For example, if the protocol requires a transition from the outbound phase to the inbound phase at clock cycle 20 from the Start signal, slave device 125 may drive the first bit of its data on cycles 20 and 21, and master 150 may acquire the data on cycle 21. Because FF 512 of master device 150 may acquire data in the second of the two consecutive clock cycles, metastability due to the late arrival of data from a slave device may be avoided, since master device 150 may sample the transmitted data after the data has had two cycles to settle and propagate.

One of the difficulties with conventional bus architectures running at high speed is that as the bus gets longer, propagation time causes an increasing delay for signals transmitted between widely separated devices. In a standard one cycle per bit bus, the delay may cause the bit to arrive too late for the acquiring latch to capture the value of the bit reliably.

In the embodiments described above with reference to FIGS. 4-6B, by allowing two cycles per bit, data can arrive nearly a cycle late and still be correctly sampled. For instance, slave device 125 may drive the data out on cycle n and cycle n+1. Due to propagation delays, the data may arrive at master device 150 when the master is on cycles n+1 and n+2. In various embodiments, as shown in the timing diagram of FIG. 6C, since master device 150 may sample the data on cycles n+1 and cycle n+3 (i.e., the second clock cycle of each two consecutive clock cycle period), it may capture the first data bit correctly on the n+1 edge, and ignore the delayed first bit data in the n+2 period. As illustrated, the data in this example has been delayed by propagation delays by nearly a full clock cycle. However, because the data is received at FF 512 of master device 150 during the second half of the RCV_EN cycle and sampled at the end of the RCV_EN cycle, the data will always be correctly sampled.

Because of its tolerance for delay on the return path, this half data rate return data protocol may tolerate much longer buses while retaining high speed clocking, when compared with conventional implementations. Furthermore, this protocol may avoid limitations on the number of loads on the bus and may keep pin requirements to a minimum. For instance, as illustrated above with reference to FIG. 6A, master device 150 and each of the slave devices 125 may be configured to transmit data via a shared signal line, e.g., of bus 155, which reduced the number of required pins in each of the master and slave devices. In other words, the data in both the outbound phase and the inbound phase may be sent via the same wire. Other systems with differing bit rates on bus direction typically require separate wires for each direction.

It is noted that slave device 125 may be any type of slave device connected to master device 150 via a bus, e.g., bus 155. For instance, slave device 125 may be any of the devices described above with reference to FIGS. 2 and 3. It should also be noted that the components described with reference to FIGS. 5A and 6A are meant to be exemplary only, and are not intended to limit the invention to any specific set of components or configurations. For example, in various embodiments, one or more of the components described may be omitted, combined, modified, or additional components included, as desired. For instance, in some embodiments, other mechanisms to sample slave data at half the data rate may be used, as long as they avoid metastability in master device 150 and sample slave data at the end of the two-clock period. It is further noted that the two-clock return path clocking technique may be implemented in other bus architectures that facility communications between master and slave devices.

Furthermore, it is noted that in other embodiments during the inbound phase slave devices 125 may transmit data at a rate of one bit per two or more consecutive clock cycles. In these embodiments, master device 150 may be configured to sample the transmitted data during the last clock cycle of the two or more consecutive clock cycle period to account for propagation delays and other issues (as described above). For instance, if slave devices 125 transmit data at a rate of one bit per three consecutive clock cycles, master device 150 may sample the transmitted data on the third cycle of each three consecutive clock cycle period.

Figure 7:
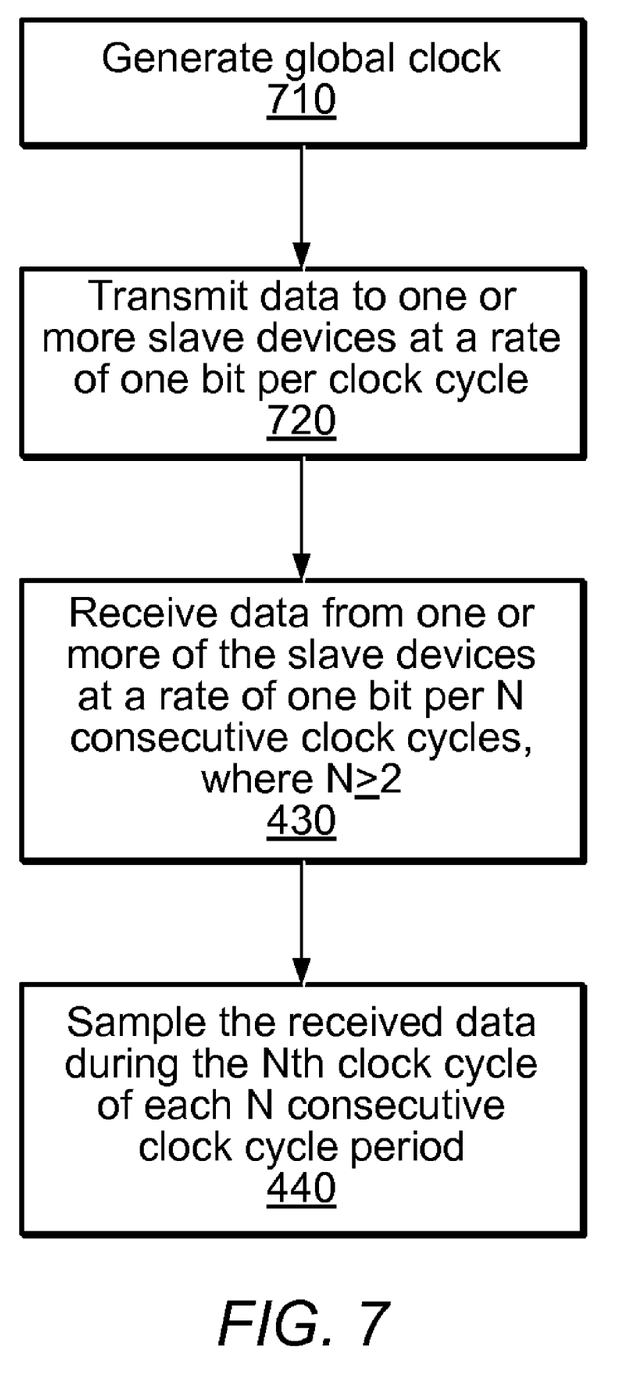
FIG. 7 is a flow diagram illustrating a method for implementing an N-cycle return path clocking, according to one embodiment.

In general, as illustrated in the flow diagram of FIG. 7, after generating the global clock (block 710), master device may transmit data to one or more slave devices 125 at a rate of one bit per clock cycle (block 720). The slave devices 125 may transmit data to master device 150 (and in some instances to other slave devices) at a rate of one bit per N consecutive clock cycles, where N≧2 (block 730). In this embodiment, master device 150 may sample the transmitted data during the $N^{th}$ clock cycle (i.e., the last clock cycle) of each N consecutive clock cycle period (block 740). It is noted that in these embodiments the design of the system may determine whether N is equal to 2, i.e., the data is transmitted at a rate of one bit per two consecutive clock cycles, or whether N is another integer greater than 2.

In some embodiments, the system (e.g., system 100) may include a mechanism for determining the value of N. Specifically, the mechanism may be configured to measure the propagation delays in the system and determine the number of consecutive clock cycles that may be required to correctly sample data transmitted from the slave devices 125. After determining the value of N, the mechanism may broadcast the findings to the master and slave devices and other components of the system. The slave devices may then begin to transmit data and the master device 150 may begin to sample the data according to the specific value of N determined by the mechanism. In one embodiment, the mechanism may be included within master device 150. It is noted, however, that in other embodiments the mechanism may be included within other parts of the system 100.

Any of the embodiments described above may further include receiving, sending or storing instructions and/or data that implement the operations described above in conjunction with FIGS. 1-7 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a bus;
a plurality of slave devices coupled to the bus; and
a master device coupled to the plurality of slave devices via the bus and configured to generate a global clock;
wherein the master device is configured to initiate a bus transaction comprising an outbound phase and an inbound phase;
wherein the master device is configured to transmit and receive data clocked on the global clock and wherein the master device is further configured to transmit data over the bus to one or more of the plurality of slave devices, during the outbound phase of the bus transaction, at a rate of one bit per clock cycle of the global clock;
wherein one or more of the plurality of slave devices is configured to receive and transmit data clocked on the global clock and wherein one or more of the plurality of slave devices is further configured to transmit data over the bus to the master device, during the inbound phase of the bus transaction, at a rate of one bit per N consecutive clock cycles of the global clock, where N is an integer greater than or equal to 2.

2. The system of claim 1, wherein one or more of the plurality of slave devices is configured to transmit the data to the master device at a rate of one bit per two consecutive clock cycles of the global clock, and wherein the master device is configured to sample the transmitted data on the second cycle of each two consecutive clock cycle periods of the global clock.

3. The system of claim 1, wherein one or more of the plurality of slave devices is configured to transmit the data to the master device at a rate of one bit per three consecutive clock cycles of the global clock, and wherein the master device is configured to sample the transmitted data on the third cycle of each three consecutive clock cycle periods of the global clock.

4. The system of claim 1, wherein the master device is configured to sample the transmitted data on the $N^{th}$ clock cycle of each N consecutive clock cycle periods of the global clock.

5. The system of claim 1, wherein one or more of the plurality of slave devices is configured to transmit data to the master device and to one or more of the other slave devices at a rate of one bit per N consecutive clock cycles of the global clock.

6. The system of claim 5, wherein each of the master device and the one or more acquiring slave devices is configured to sample the transmitted data on the $N^{th}$ clock cycle of each N consecutive clock cycle periods of the global clock.

7. The system of claim 1, wherein the bus includes a plurality of signal lines, wherein the master device and one or more of the plurality of slave devices are configured to transmit and receive data via a shared signal line of the bus.

8. The system of claim 7, wherein the bus has a reduced pin count relative to an LPC bus.

9. The system of claim 8, wherein the bus is a three-wire bus.

10. The system of claim 1, wherein, if the bus includes two or more data lines, the master device is configured to transmit data to one or more of the plurality of slave devices at a rate of one bit per clock cycle of the global clock per data line.

11. The system of claim 1, wherein one or more of the plurality of slave devices are configured to transmit data to the master device at a rate of one bit per two consecutive clock cycles of the global clock during the inbound phase of the bus transaction.

12. The system of claim 1, further comprising a mechanism configured to measure propagation delays in the system and determine the number N of consecutive clock cycles of the global clock needed to sample data transmitted from the slave devices to the master device.

13. A method for transmitting data between a master device and a plurality of slave devices, wherein data is transmitted during a bus transaction that comprises an outbound phase and an inbound phase, the method comprising:
generating a global clock;
clocking the master device and the slave device on the global clock;
transmitting data clocked on the global clock, from the master device to one or more of a plurality of slave devices via a bus, during the outbound phase of the bus transaction, at a rate of one bit per clock cycle of the global clock; and
receiving data clocked on the global clock at the master device from one or more of a plurality of slave devices via the bus, during the inbound phase of the bus transaction, at a rate of one bit per N consecutive clock cycles of the global clock, where N is an integer greater than or equal to 2.

14. The method of claim 13, further comprising, in response to receiving the data at the master device at a rate of one bit per two consecutive clock cycles of the global clock, sampling the transmitted data on the second cycle of each two consecutive clock cycle periods of the global clock.

15. The method of claim 13, further comprising, in response to receiving data at the master device at a rate of one bit per N consecutive clock cycles of the global clock, sampling the received data on the $N^{th}$ clock cycle of each N consecutive clock cycle periods of the global clock.

16. The method of claim 13, wherein the bus includes a plurality of signal lines, wherein said transmitting and receiving data via the bus includes transmitting and receiving data via a shared signal line of the bus.

17. A master device configured to initiate a bus transaction comprising an outbound phase and an inbound phase, the master device comprising:
a clock generation unit configured to generate a global clock; and
a transceiver unit configured to transmit data clocked on the global clock to one or more of a plurality of slave devices at a rate of one bit per clock cycle of the global clock, during the outbound phase of the bus transaction;
wherein the transceiver unit is configured to receive data clocked on the global clock from one or more of the plurality of slave devices at a rate of one bit per two consecutive clock cycles of the global clock, during the inbound phase of the bus transaction;
wherein the transceiver is further configured to sample the received data on the second cycle of each two consecutive clock cycle periods of the global clock.

18. A computer system comprising:
a low pin count (LPC) bus;
a master device coupled to the LPC bus;
a second bus coupled to the master device, wherein the second bus has a reduced pin count relative to the LPC bus; and
a plurality of slave devices coupled to the master device via the second bus;
wherein the master device is configured to generate a global clock;
wherein the master device is further configured to initiate a bus transaction comprising an outbound phase and an inbound phase;
wherein the master device is further configured to transmit data clocked on the global clock to one or more of the plurality of slave devices over the second bus, during the outbound phase of the bus transaction, at a rate of one bit per clock cycle of the global clock;
wherein one or more of the plurality of slave devices is configured to transmit data clocked on the global clock to the master device over the second bus, during the inbound phase of the bus transaction, at a rate of one bit per two consecutive clock cycles of the global clock;
wherein the master device is further configured to sample the received data clocked on the global clock on the second cycle of each two consecutive clock cycle periods of the global clock, during the inbound phase of the bus transaction.

19. The computer system of claim 18, wherein the second bus includes a plurality of signal lines, wherein the master device and one or more of the plurality of slave devices are configured to transmit and receive data via a shared signal line of the bus.

20. The computer system of claim 18, wherein the master device is a Super I/O controller.

21. The computer system of claim 18, wherein the plurality of slave devices include at least two of a parallel port, a serial port, a mouse interface, a universal asynchronous receiver-transmitter (UART), a trusted platform module (TPM), an infrared interface, a thermal sensor, a keyboard controller, and floppy disk controller.

* * * * *